Jan. 7, 1958　　　A. C. JANDRIS ET AL　　　2,819,046
VIBRATION ABSORBING APPARATUS
Filed Nov. 13, 1953　　　　　　　　　　　　3 Sheets-Sheet 1

INVENTORS
Albert C. Jandris
Joseph A. Jandris
BY Chas. R. Fay, atty.

Jan. 7, 1958   A. C. JANDRIS ET AL   2,819,046
VIBRATION ABSORBING APPARATUS
Filed Nov. 13, 1953   3 Sheets-Sheet 3

INVENTORS
Albert C. Jandris +
BY Joseph A. Jandris
Charles R. Fay,
atty.

United States Patent Office 2,819,046
Patented Jan. 7, 1958

2,819,046

VIBRATION ABSORBING APPARATUS

Albert C. Jandris and Joseph A. Jandris, Gardner, Mass.

Application November 13, 1953, Serial No. 391,827

3 Claims. (Cl. 259—72)

This invention relates to a new and improved vibration-absorbing apparatus particularly adapted for cement block making machinery but having uses in other relations wherever the same may be found useful.

In the making of cement blocks, the procedure briefly is to provide a hopper for wet cement, a forming device or former for the block below the hopper into which a charge of cement is periodically deposited, a vibration mechanism for severely agitating the former to settle or pack the cement, and means for discharging the thus formed block from the former, the block being cured thereafter. The greater the vibration, the better the block will be, since it will be denser and harder; but also the greater the vibration, the greater damage is done to the machine and even the building in which it may be placed. The vibration causes damage to many parts of the machine which must be replaced periodically and in particular rubber pads and the like used in the prior art for attempting to dampen the vibration and to support the former, very quickly wear out in a matter of days and have to be replaced, causing the machine to be idle for the down time required. Other parts wear out also and the question of vibration will be seen to be a serious one inasmuch as it is obvious that the less vibration, the poorer the block, although easier on the machinery.

A further object of the invention resides in the provision of a particular construction which not only absorbs the vibration of the conventional machine so that cement blocks which are as good as those of the prior art may be made without damage to vibration dampening apparatus and to other parts of the machine normally damaged, but also the vibration may be stepped up to a considerable degree, resulting in faster production of better cement blocks, in addition to the benefit of avoiding vibration shock and damage to machine parts and to the installation of the apparatus itself.

A further object of the invention resides in the provision of a combined spring, metal plate, and rubber pad vibration-absorbing construction which is effective to cause the springs to take up the shock and themselves being cushioned since they are connected by rubber pads to supporting means so that although the vibration is intense, the springs will absorb the same in combination with the resilient pads that are interposed between the ends of the springs and the block former being vibrated.

Other objects and advantages of the invention will appear hereinafter.

Reference is to be had to the accompanying drawings, in which.

Figure 1:
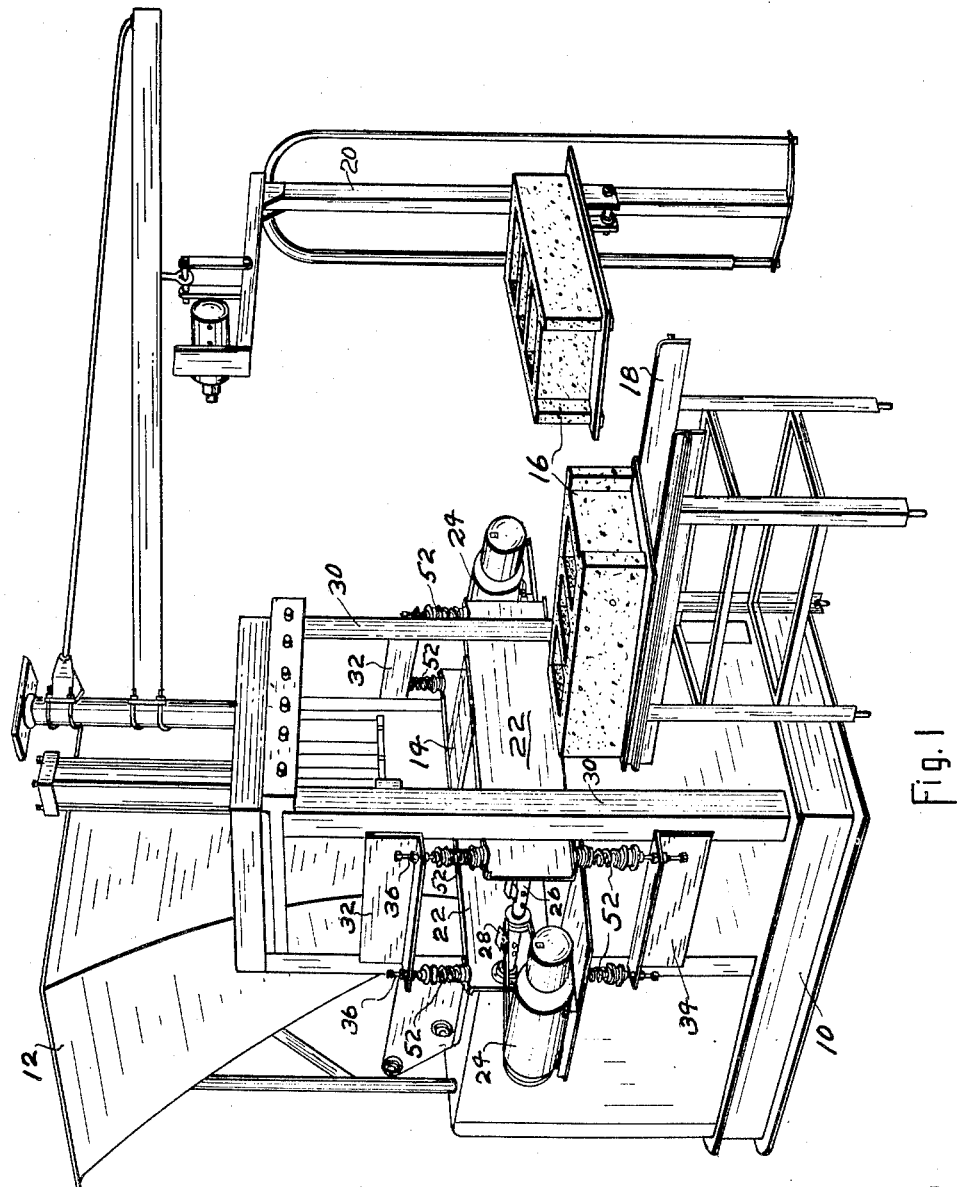
Fig. 1 is a perspective view illustrating a cement block forming machine with the novel vibration-absorbing apparatus applied thereto.
Figure 3:
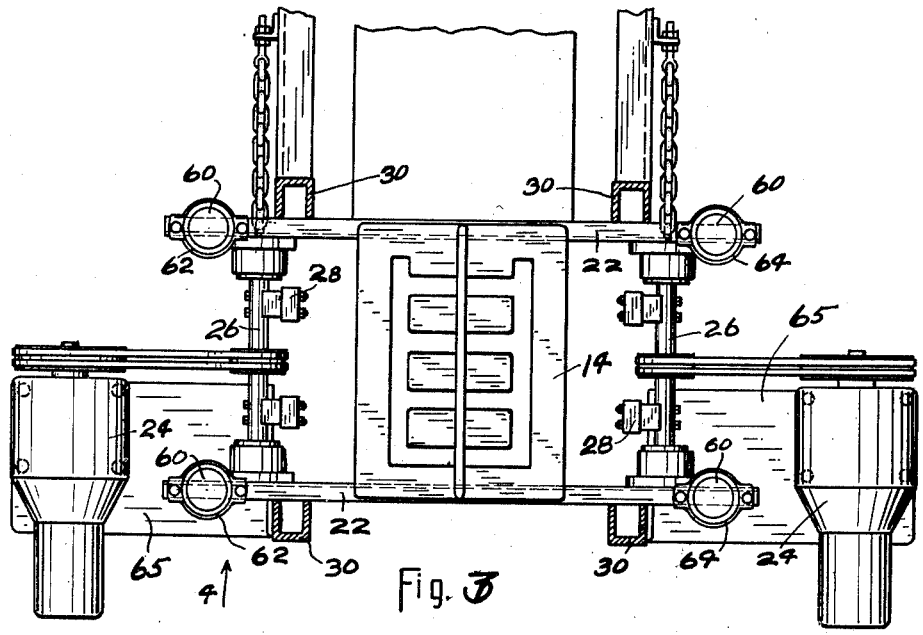
Fig. 3 is a section on line 3—3 of Fig. 2.

In the making of cement blocks, there is commonly provided a base or the like 10 which is set up according to need and is usually secured to the floor of a building or to a base which is embedded in the floor. The reference numeral 12 indicates a cement hopper which is in overhead position and provided with means (not shown) for intermittently discharging a measured quantity of cement to the former or mold generally indicated at 14. The formed blocks are indicated at 16 and are removed in any way desired, the block former being provided with automatic means for opening up and shoving the cement blocks out of the machine to a rack or support indicated at 18. Mechanical means as indicated by the carrier 20 may be utilized for removing the blocks to storage racks for curing.

All of the above mechanism is old and well known in the art and need not be further described. The brief description above and the showing in Fig. 1 is for the purpose of illustration and to locate the present invention in the art.

The block former 14 is vibrated through bar members 22 in order to shake down and compact the cement and as will be clear, the greater the vibration, the denser and harder the blocks 16 will be and therefore the better the finished product. The bars 22 are vibrated from each end of the machine by means of intermittently controlled and operated motors 24 which rapidly rotate shafts 26 upon which are mounted bolted-on eccentric weights 28, the shaft ends being mounted in the bars 22. This vibration is intense and results in damage to the entire machine as well as to rubber pads which are normally interposed between the bars 22 and supporting framework members such as 30 for the machine itself.

Figure 4:
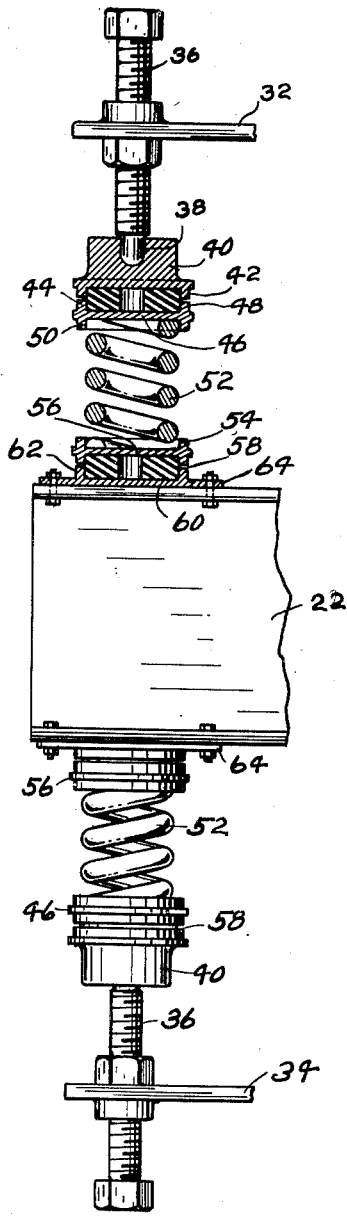
Fig. 4 is a view in elevation, partly in section, on a still further enlarged scale, showing the construction of the vibrating oscillating means and looking in the direction of arrow 4 in Fig. 3.
Figure 5:
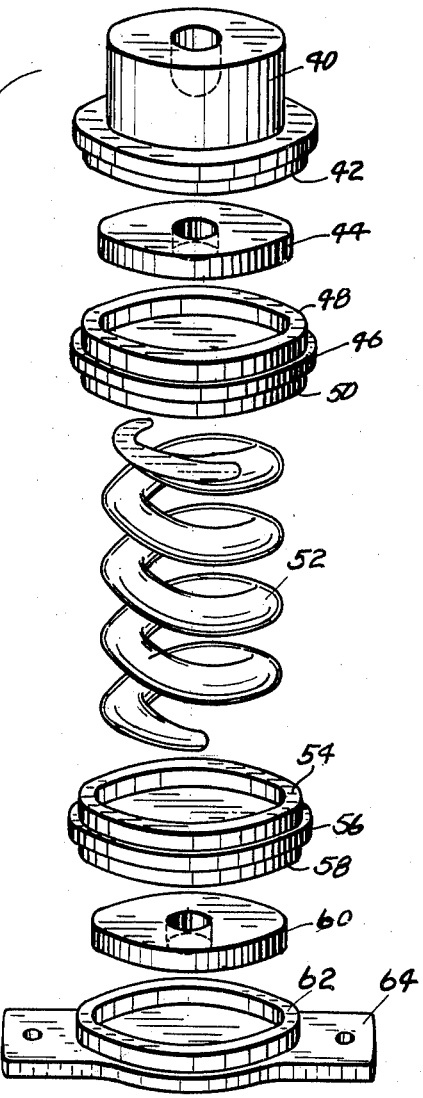
Fig. 5 is an exploded view of one of the absorbing devices on a still further enlarged scale.

The present invention contemplates the provision of additional supports 32 and 34 perhaps best seen in Figs. 1 and 4. These members are rigidly secured to the framework of the machine as shown in Fig. 1 and the member 32 is provided with a horizontal flange in which is threaded a screw 36. This screw has a rounded end at 38 that loosely bears in a cap 40, see Fig. 4. Cap 40 is provided with a circular flange 42 which serves to encompass a rubber pad 44, this pad being resilient and of any suitable nature or material in addition to rubber. The pad, however, is loosely mounted and has a height, as clearly shown in Fig. 4, at least double the height of the flange 42, so that the pad 42 extends downwardly therefrom.

A plate 46 is provided with an upper flange 48 and a lower flange 50, the upper flange receiving the lower portion of the pad 44 and the lower flange 50 receiving the upper end of a relatively strong coil spring 52.

The lower end of spring 52 is received on a plate 54 having a circular flange 56 and an oppositely extending or lower circular flange 58 receiving a resilient pad 60, the lower end of the resilient pad 60 being received in a circular flange 62 on the plate 64 bolted to a portion of member 22.

Figure 2:
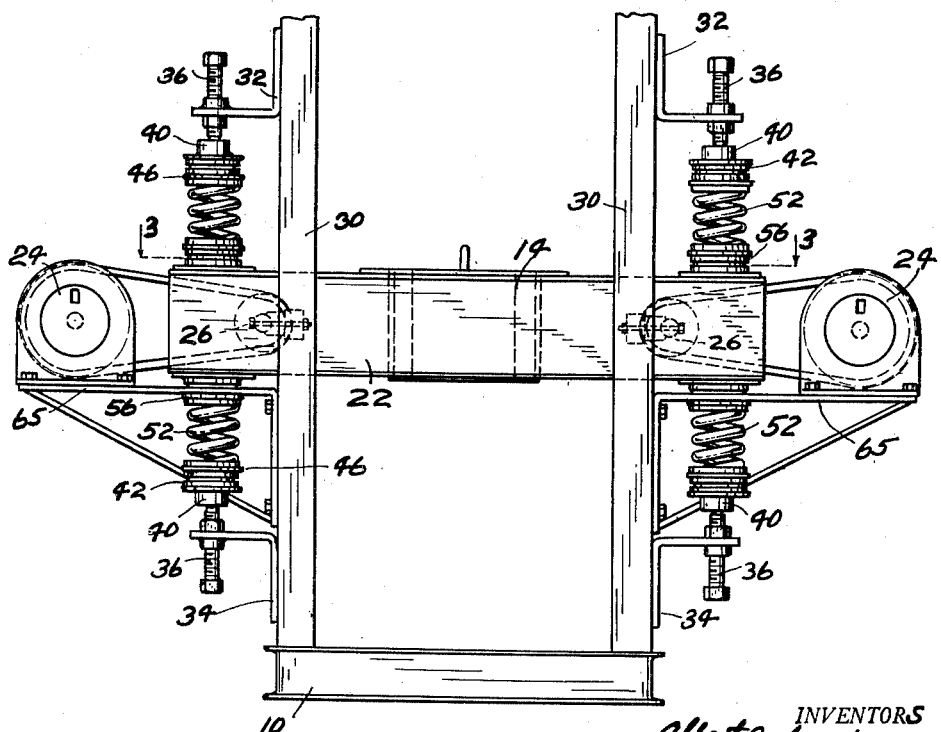
Fig. 2 is a view in front elevation showing the vibration-dampening apparatus on an enlarged scale.

The member 52 is supported on the same type of construction but inverted as clearly shown in Fig. 4 as well as Fig. 2, and the reference numerals have therefore been applied in the same manner. The lower construction may work through holes in the platforms 65 supporting motors 24 or they may be located to one side as in Fig. 1.

Each of the bars 22 of which there are two arranged in parallel relationship, is provided at each end with the vibrating dampening construction recited, and this requires eight separate springs and double rubber pad constructions as above described.

When the motors 24 are energized to rapidly rotate the shafts 26, the bars 22 are rapidly vibrated in a vertical direction, but this vibration is not transmitted either to the members 30 or to the plates 32 or 34 in any appreciable degree and the reason for the absorption of the vibration resides in the special construction and the combination of the relatively heavy springs which absorb the vibration, together with the metal plates 46 and 56 at each end of each spring and the resilient pads 44 and 60 which support the plates, it being particularly noted that there is a continuous circular gap between flange 42 on member 40 and flange 48 on the plate 46, and the same is true in the construction of all the other similar members.

The relatively heavy springs 52 therefore absorb the vibration but any chatter or internal vibration of the springs is absorbed through the metal plates and the resilient pads above described. The vibration can be materially increased by increasing the weights 28, and better blocks can be produced without damage to the machine or to the vibration-absorbing construction itself which has been found to last indefinitely as compared with a very few weeks of operation and sometimes even days of operation formerly providing for complete destruction of the rubber pads heretofore used.

Having thus described our invention and the advantages thereof, we do not wish to be limited to the details herein disclosed, otherwise than as set forth in the claims, but what we claim is:

1. Apparatus of the class described comprising a base, a former for cementitious blocks thereon, a pair of bars one at each side of the block former, the bars being secured to the block former, means to intermittently vibrate the bars, means supporting the bars to float so as to vibrate, said bar supporting means being mounted on the base and absorbing vibration to substantially prevent vibration in the base and other parts of the apparatus, said bar supporting means comprising springs resting at one end on the bars at the upper edges thereof and springs on which the bars rest, and resilient pads interposed between each spring and its bar, the bars and former being suspended by the springs and being damped both up and down.

2. Apparatus of the class described comprising a base, a block former thereon, a pair of bars one at each side of the block former, the bars being secured to the former, means to intermittently vibrate the bars, means supporting the bars to float so as to vibrate, said bar supporting means being mounted on the base and absorbing vibration to substantially prevent vibration in the base and other parts of the apparatus, said bar supporting means comprising springs resting at one end on the bars at the upper edges thereof and springs on which the bars rest, and resilient pads interposed between each spring and its bar, and further resilient pads located at the other end of each spring.

3. Apparatus of the class described comprising a base, a block former thereon, a pair of bars one at each side of the block former, the bars being secured to the former, means to intermittently vibrate the bars, means supporting the bars to float so as to vibrate, said bar supporting means being mounted on the base and absorbing vibration to substantially prevent vibration in the base and other parts of the apparatus, said bar supporting means comprising springs resting at one end on the bars at the upper edges thereof and springs on which the bars rest, and resilient pads interposed between each spring and its bar, means to locate the other ends of the upper springs, and means to support the lower springs, and loose resilient pads between each of said last-named two means and the corresponding spring.

References Cited in the file of this patent

UNITED STATES PATENTS

| Number | Name | Date |
|---|---|---|
| 804,884 | Rutan | Nov. 21, 1905 |
| 1,089,748 | Clark | Mar. 10, 1914 |
| 1,114,417 | Turton | Oct. 20, 1914 |
| 2,371,522 | Hutter | Mar. 13, 1945 |
| 2,446,818 | Flam | Aug. 10, 1948 |
| 2,514,078 | Lee | July 4, 1950 |

FOREIGN PATENTS

| Number | Country | Date |
|---|---|---|
| 62,819 | Norway | Aug. 12, 1940 |
| 533,175 | Great Britain | Feb. 7, 1941 |
| 609,540 | Great Britain | Oct. 4, 1948 |